United States Patent
Razumov

(10) Patent No.: US 7,657,457 B2
(45) Date of Patent: Feb. 2, 2010

(54) GRAPHICAL USER INTERFACE FOR PRODUCT ORDERING IN RETAIL SYSTEM

(76) Inventor: Sergey N. Razumov, Electricheskiy Pereulok, dom 8, korpus 4, kvartira 7, Moscow (RU)

( * ) Notice: Subject to any disclaimer, the term of this patent is extended or adjusted under 35 U.S.C. 154(b) by 655 days.

(21) Appl. No.: 10/354,025

(22) Filed: Jan. 30, 2003

(65) Prior Publication Data

US 2004/0153371 A1 Aug. 5, 2004

(51) Int. Cl.
G06Q 30/00 (2006.01)
G06F 15/00 (2006.01)

(52) U.S. Cl. .......................... 705/26; 705/27
(58) Field of Classification Search .................. 705/26, 705/29
See application file for complete search history.

(56) References Cited

U.S. PATENT DOCUMENTS

| | | | |
|---|---|---|---|
| 5,664,110 A * | 9/1997 | Green et al. | 705/26 |
| 6,026,377 A * | 2/2000 | Burke | 705/27 |
| 6,246,998 B1 * | 6/2001 | Matsumori | 705/27 |
| 6,381,583 B1 * | 4/2002 | Kenney | 705/26 |
| 2002/0156688 A1 * | 10/2002 | Horn et al. | 705/26 |
| 2003/0004811 A1 * | 1/2003 | Omori | 705/17 |
| 2003/0009392 A1 * | 1/2003 | Perkowski | 705/26 |
| 2003/0083956 A1 * | 5/2003 | Freeny, Jr. | 705/26 |

OTHER PUBLICATIONS

Hairong Li, Terry Daugherty, & Frank Biocca, (2002). Impact of 3-D advertising on product knowledge, brand attitude, and purchase intention: Journal of Advertising, vol. 31, Iss. 3; p. 43, 15 pgs.*

* cited by examiner

*Primary Examiner*—Matthew S Gart
*Assistant Examiner*—Garcia Ade
(74) *Attorney, Agent, or Firm*—McDemott Will & Emery LLP

(57) ABSTRACT

A computer system is provided for operating a graphical user interface (GUI) to enable a customer to select products. The system comprises a displaying mechanism displaying virtual shelves containing a plurality of first selectable elements in a form of product images arranged on the shelves to represent available products in a group of products selected by the customer, and a plurality of second selectable elements attached to respective first selectable elements. The second selectable elements are in a form of a price tags or price labels attached to the respective product images.

8 Claims, 13 Drawing Sheets

YOUR ORDER

Please review your order and press the Order button if OK or Back button to continue forming your order

| TITLE | PRICE | QTY | SUM |
|---|---|---|---|
| TOMADINI 500 gr. | 31.00 | 1 | 31.00 |
| Pasta Zara 61 | 51.45 | 1 | 51.45 |
| Pasta Zara 62 | 51.46 | 1 | 51.46 |

Total, roubles: 133.91

PLACE ORDER

YOUR BASKET — 133.91 roubles
SUBMIT ORDER
HELP
OTHER FUNCTIONS
BACK

FIG. 11

GRAPHICAL USER INTERFACE FOR PRODUCT ORDERING IN RETAIL SYSTEM

RELATED APPLICATION

The present application is related to my U.S. patent application Ser. No. 09/745,420 filed on Dec. 26, 2000, entitled "RETAIL SYSTEM WITH PURCHASE ORDERING" and incorporated herewith by reference.

FIELD OF THE INVENTION

The present application relates to retail systems, and more particularly, to a graphical user interface for enabling a customer of a retail system to place an order for a product.

BACKGROUND OF THE INVENTION

It is well known that the most expensive place to hold merchandise is on the shelf of a retail store because of all resources it consumes until that point, such as labor, transportation, and storage costs. In addition, consumer study conducted by Anderson Consulting (now Accenture) and the Food Marketing Institute (FMI) showed that of the products consumers want in a grocery store, 6% to 8% are out-of-stock. For promotional items, this number jumps to 25% out-of-stock products. The study concluded that the out-of-stock levels add up to about $100 billion in lost sales for retailers.

Therefore, there is a need for retail mechanisms that would enable retailers to meet customers' demands without having to hold merchandise on the shelves. For example, a retail system disclosed in my copending U.S. patent application Ser. No. 09/745,420 filed on Dec. 26, 2000, entitled "RETAIL SYSTEM WITH PURCHASE ORDERING" and incorporated herewith by reference, employs a purchase ordering mechanism in a retail system controlled by a control system and comprising at least one storage facility for storing goods available for sale in the retail system, and multiple purchase obtaining points. Each purchase obtaining point enables a customer to obtain an ordered purchase after a time period sufficient to deliver the ordered purchase from the storage facility to the purchase obtaining point. To order the purchase, the customer may use a computer terminal remote with respect to the purchase obtaining points, or a computer terminal installed at one of the purchase obtaining points. Alternatively, a purchase may be ordered via a telephone system.

A computer system may provide an electronic version of a catalog that lists available items. A customer may browse through the catalog using a browser and select various items to be purchased. The selection of the various items from the electronic catalog generally imitates a "basket" or "shopping cart". When the user selects an item from the electronic catalog, the server computer system metaphorically adds that item to the customer's basket or shopping cart.

However, known systems of browsing the catalog and selecting various products involve complex procedures making it difficult for a customer to order products electronically. Hence, there is a need for a user-friendly graphical user interface that would facilitate product ordering.

SUMMARY OF THE INVENTION

The present application provides novel system for operating a graphical user interface (GUI) for enabling a customer to select products. The system comprises a displaying mechanism configured to display at least one virtual shelf containing a plurality of first selectable elements in a form of product images arranged on the shelve to represent available products in a group of products selected by the customer. Also, the virtual shelf contains a plurality of second selectable elements attached to respective first selectable elements. The second selectable elements are in a form of price tags or price labels attached to the respective product images.

The displaying mechanism may display multiple virtual shelves arranged horizontally and containing the first selectable elements, and the second selectable elements attached to respective first selectable elements.

Further, the displaying mechanism may display a purchase icon such as a "basket" or "shopping card" that represents a purchase composed of items currently selected by the customer.

When a customer selects a second selectable element attached to a first selectable element, a selection mechanism modifies the purchase icon to reflect addition of a product represented by the first selectable element to the purchase. When the customer selects the first selectable element, the selection mechanism controls the displaying mechanism to display information on the product represented by the first selectable element.

When the purchase icon is selected by the customer, the selection mechanism controls the displaying mechanism to display the virtual shelf containing items placed in the basket or shopping card. Each of these items is represented by the first selectable element and the second selectable element attached to that first selectable element.

The computer system may further comprise a sorting mechanism responsive to an input from the customer for selecting the order in which the first selectable elements are arranged on a virtual shelf in accordance with a selected criterion. For example, products may be displayed in order of their price, size or nutritional values, such as calorific values and cholesterol content.

Also, the computer system may comprise a limiting mechanism responsive to an input from the customer for limiting number of the first selectable elements on the virtual shelf in accordance with a selected criterion. For example, the customer may request that only products of a selected price range or size range be displayed. Also, customers may limit the displayed products to goods of certain quality. For example, customers may request displaying only low-fat or no-fat products.

In accordance with another aspect of the invention, a system for enabling a customer to select products for a purchase may comprise a terminal having a display component for displaying a screen including a purchase area representing the purchase, and a product area representing a product and including a graphical representation of the product with a price tag attached to the product to indicate a price of the product. A selection mechanism is responsive to selection of the graphical representation of the product for causing the terminal to display information on the product, and responsive to selection of the price tag for causing the terminal to modify the purchase area so as to reflect addition of the product to the purchase.

The terminal may be provided at a retail facility or a customer's personal computer or other digital device may be used.

In accordance with a further aspect of the invention, a computer system for enabling a customer to select products for a purchase comprises a processor, and a memory coupled to the processor. The memory stores therein at least one sequence of instructions, which when executed by the processor, causes the computer system to perform the steps of:

displaying a screen having a purchase area representing the purchase, and a product area representing a product and including a graphical representation of the product with a price tag attached to the product to indicate a price of the product;

displaying information on the product, when the customer selects the graphical representation of the product, and modifying the purchase area to include information indicating that the product is added to the purchase, when the customer selects the price tag.

In accordance with another aspect of the invention, a computer program product for supporting a terminal for enabling a customer to select products for a purchase comprises at least one sequence of computer executable instructions, and a computer readable memory medium bearing the executable instructions in computer readable form, wherein execution of the instructions by a processor causes the terminal to:

display a screen having a purchase area representing the purchase, and a product area representing a product as a combination of graphical representation of the product and a price tag attached to the product to indicate a price of the product;

display information on the product, when the customer selects the graphical representation of the product, and modify the purchase area to include information indicating that the product is added to the purchase, when the customer selects the price tag.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 11 shows an order review screen that enables the customer to review her purchase order.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and entities are shown in block diagram form in order to avoid unnecessarily obscuring the present invention.

Figure 1A:
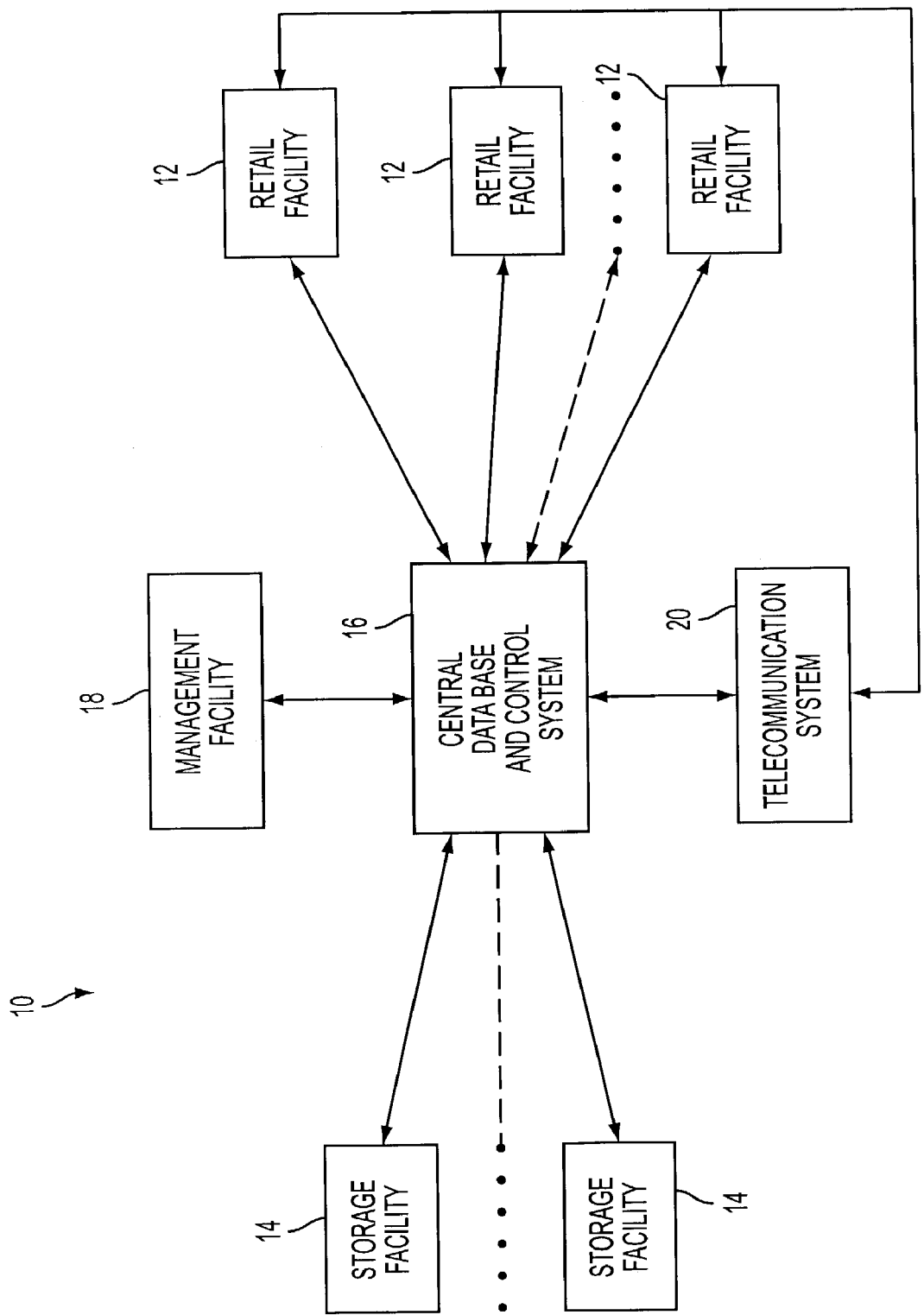
FIG. 1A illustrates a retail system of the present invention.

FIG. 1A illustrates an exemplary retail system 10, in which a purchase ordering system of the present invention may be implemented. The retail system 10 may comprise a plurality of retail facilities 12 for enabling customers to order and/or receive purchases, a plurality of storage facilities 14, a central data base and control system 16, a management facility 18, and a telecommunications system 20, such as an Internet-based communications network. For example, the retail system 10 of the present invention may sell such items as food products, consumer goods, video/audio products, etc. A delivery system may be provided to enable delivery of goods to the storage facilities 14, and from the storage facilities 14 to the retail facilities 12 or to other purchase obtaining points such as a customer's place of residence or business.

Each retail facility 12 may contain at least one purchase ordering terminal for enabling customers to order products available in the retail system 10. Also, the purchase ordering terminals may be installed in various points of ordering arranged conveniently for customers, for example, at community centers, office buildings, industrial facilities, post offices, parking lots, etc.

The purchase ordering terminal may be a touch screen computer having a touch sensitive screen. The user may interface with the computer by appropriately touching areas of the display screen with the finger to execute commands, enter data, respond to prompts, etc. As discussed in more detail later, the purchase ordering terminal may have a user-friendly graphical user interface (GUI) of the present invention that facilitates purchase ordering using a touch screen computer.

Also, the retail system 10 enables users to place an order using their personal computers, such as desktop and laptop computers, or other personal digital devices, such as personal digital assistants or cell phones. As discussed below, the graphical user interface of the present invention makes it substantially easier and quicker to order a purchase using customers' personal computers or other digital devices. Moreover, to facilitate the ordering process, the customer may be provided with a data storage device, such as a CD-ROM or DVD device, which contains information on items available in the retail system 10. At the beginning of a purchase ordering session, the telecommunications system 20 may connect the customer's data storage device to the central data base and control system 16 to update the information stored by the data storage device.

Figure 1B:
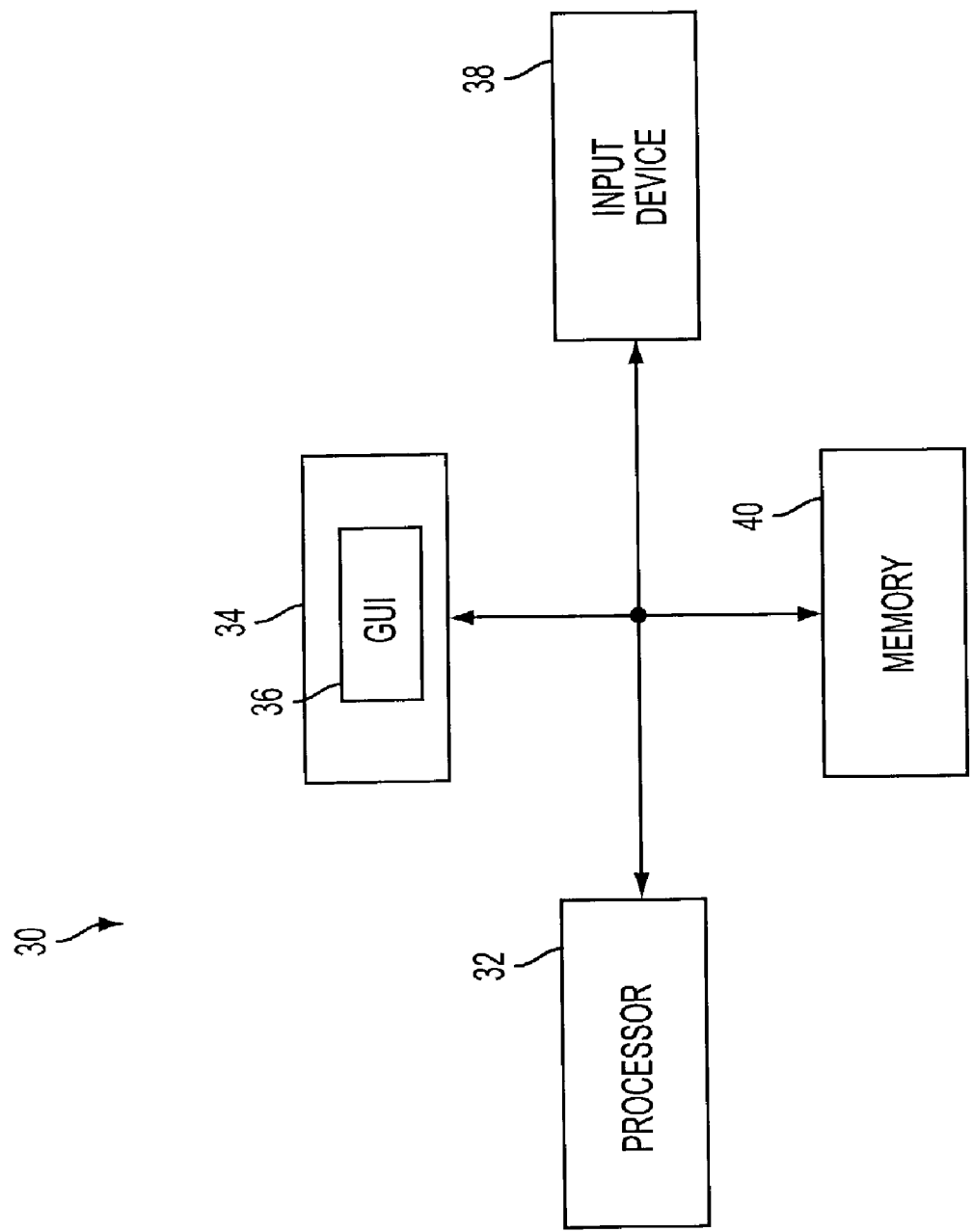
FIG. 1B is a simplified block diagram illustrating a computer system of the present invention.

Hence, a computer system 30 (FIG. 1B) of the present invention may be implemented based on the purchase ordering terminal of the retail system 10, or a customer's personal computer or other digital device. The computer system 30 includes a processor 32, a display device 34 for displaying a GUI 36, an input device 38, and a memory 40 coupled to the processor for storing sequences of instructions executed by the processor 32 to provide operations of the GUI 36. The input devices 38 for enabling a customer to interact with the GUI may include, without limitation, touch screen devices, keyboards and pointing devices such as an electronic mouse, trackball, light pen, thumb wheel, digitizing tablet, touch sensitive pad.

The memory 40 may store a number of items including a GUI program and a runtime environment. The runtime environment typically is an operating system which manages computer resources required for embodiments of the present invention to operate. The runtime environment may also be a microkernel, a message passing system, a dynamic loadable linkable module, a browser application for the World Wide Web, a runtime interpreter environment, or any other system which manages computer resources.

Via the telecommunication system 20, information on purchase orders made by customers using the purchase ordering terminals or their personal computers or other digital devices is transferred to the central data base and control system 16 for arranging purchase delivery from the respective storage facility 14 to the retail facility 12 selected by the customer or other purchase obtaining point.

Figure 2A:
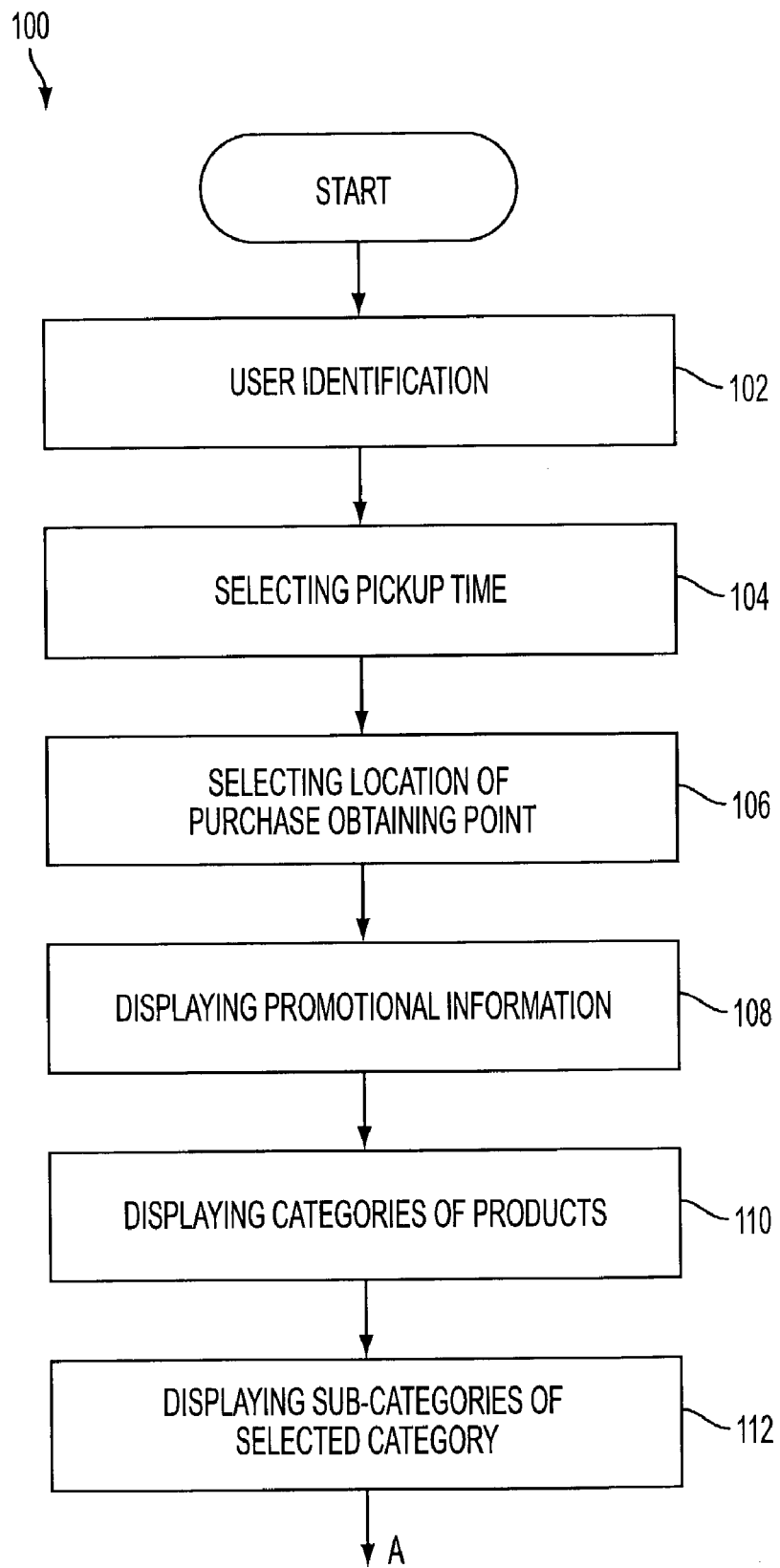
FIGS. 2A and 2B show a flow chart illustrating operations involving a graphical user terminal (GUI) of the present invention.
Figure 2B:
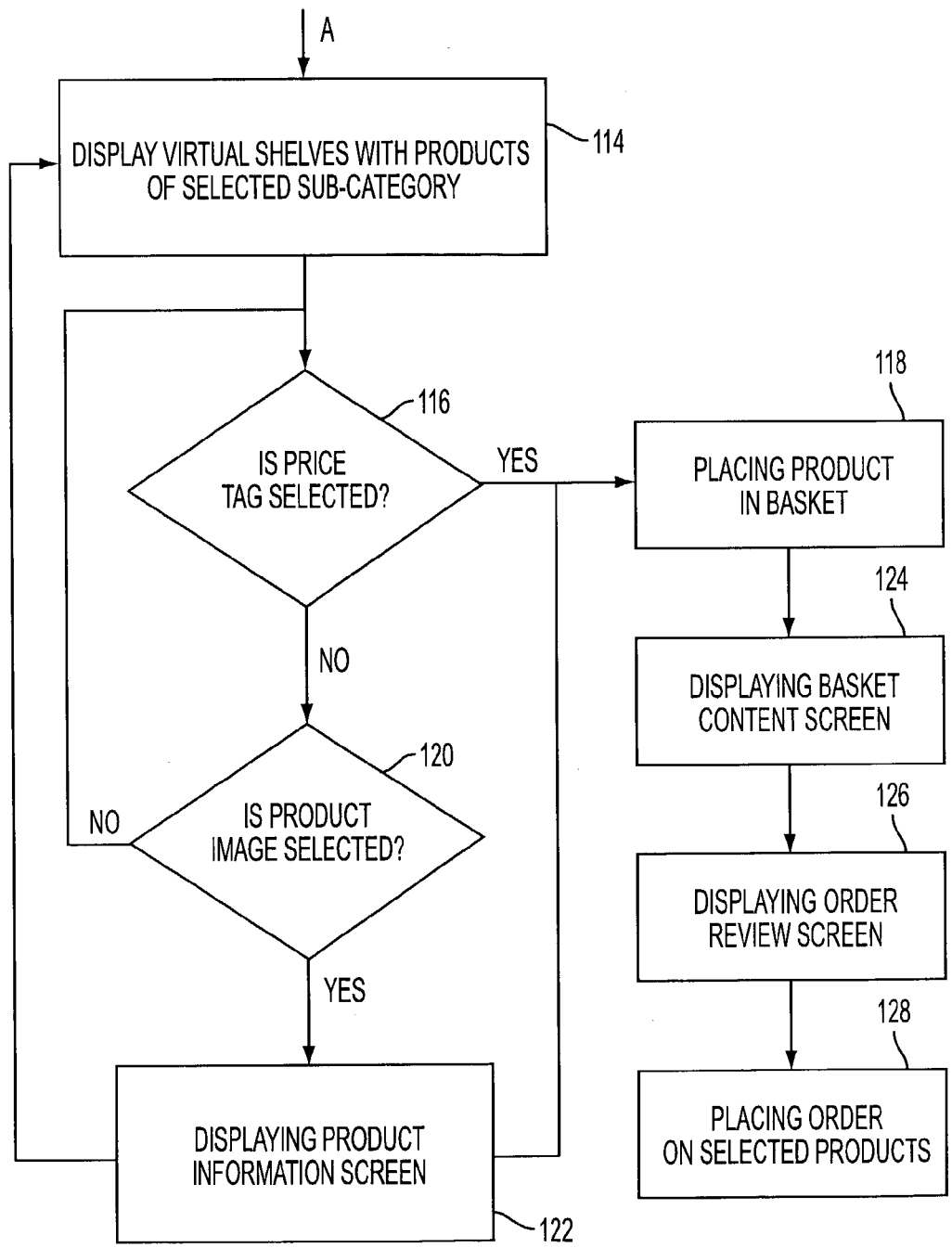

FIGS. 2A and 2B show a flow chart 100 illustrating purchase ordering operations involving the graphical user interface (GUI) 36 of the present invention. The flow chart broadly illustrates the logical flow of steps to perform an embodiment of the present invention. Accordingly, numerous steps may be added to, or taken away from the flow chart, and order of the steps may be changed without departing from the scope of the invention. Additional considerations in implementing the method described by the flow chart may also dictate changes in the selection and order of the steps.

At step 102, a customer is identified. If the customer accesses the purchase ordering terminal, she may be identified using the customer's card issued by the retail system 10. If a personal computer or other personal digital device is used for purchase ordering, the customer may be identified during a log-in procedure that involves entering a user name and a password assigned to that customer.

Figure 3:
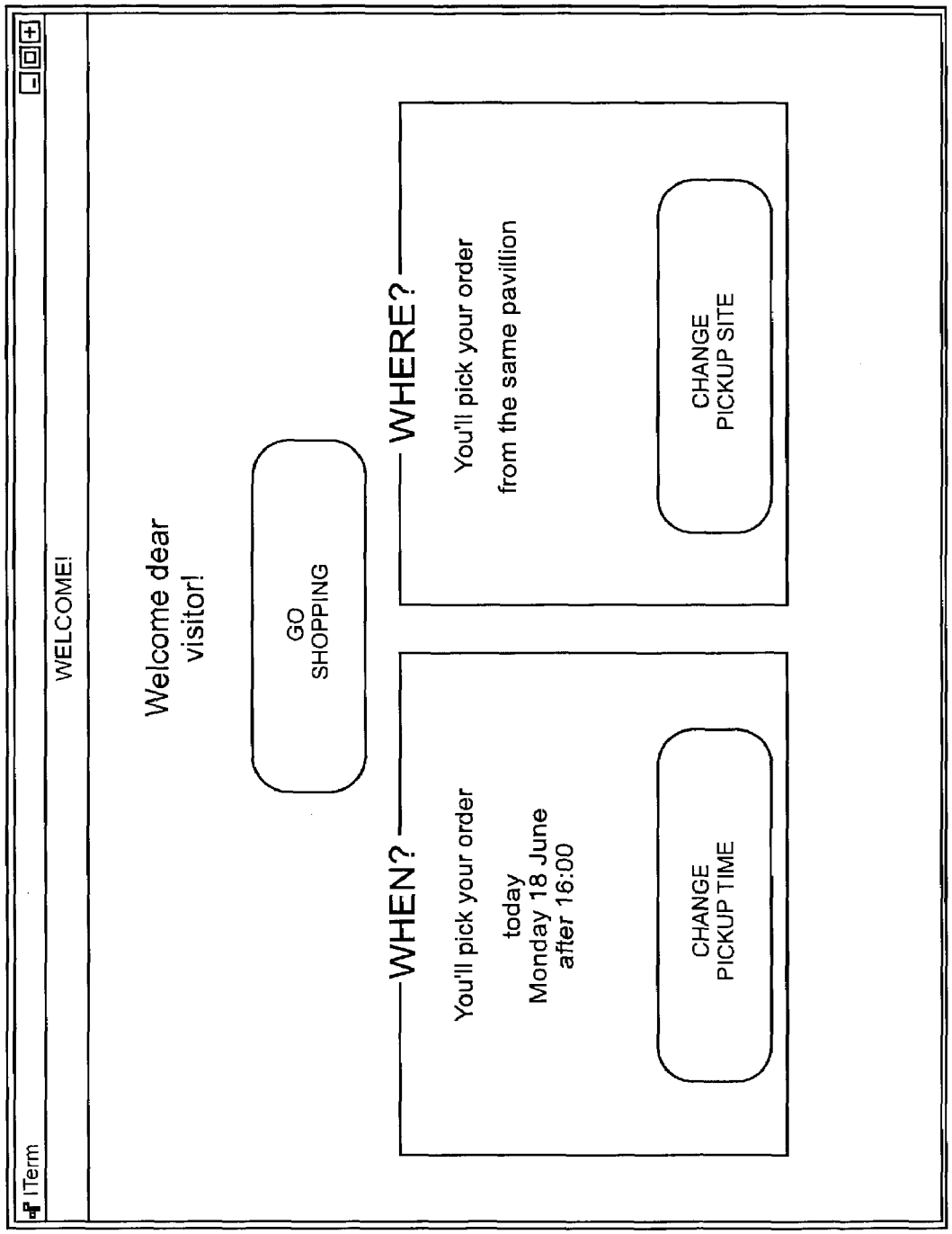
FIG. 3 shows a welcome screen displayed by the GUI.

After the customer is identified, the GUI 36 displays a welcome screen (FIG. 3) that enables the customer to select time and place to pick up the ordered purchase. The welcome screen may display default information on time and place of purchase pick-up. For example, if the customer places her order in the morning, the default time may be the afternoon of the same day. The default pick-up location may be the retail facility 12 at which the purchase ordering terminal is located, or a purchase obtaining location selected by the customer during the previous purchase ordering session.

Figure 4:
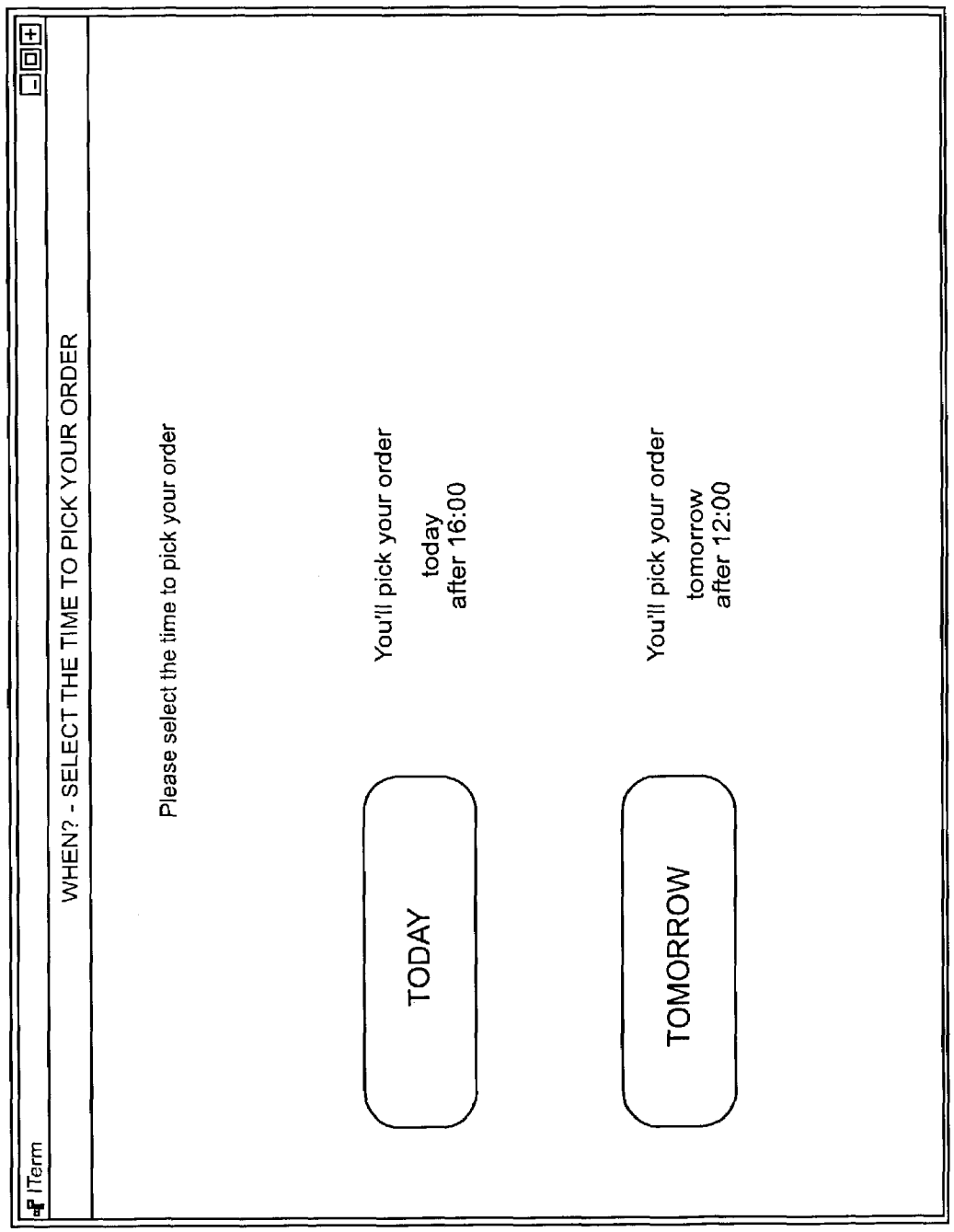
FIGS. 4 and 5 show pickup time and pickup location selection screens displayed by the GUI.
Figure 5:
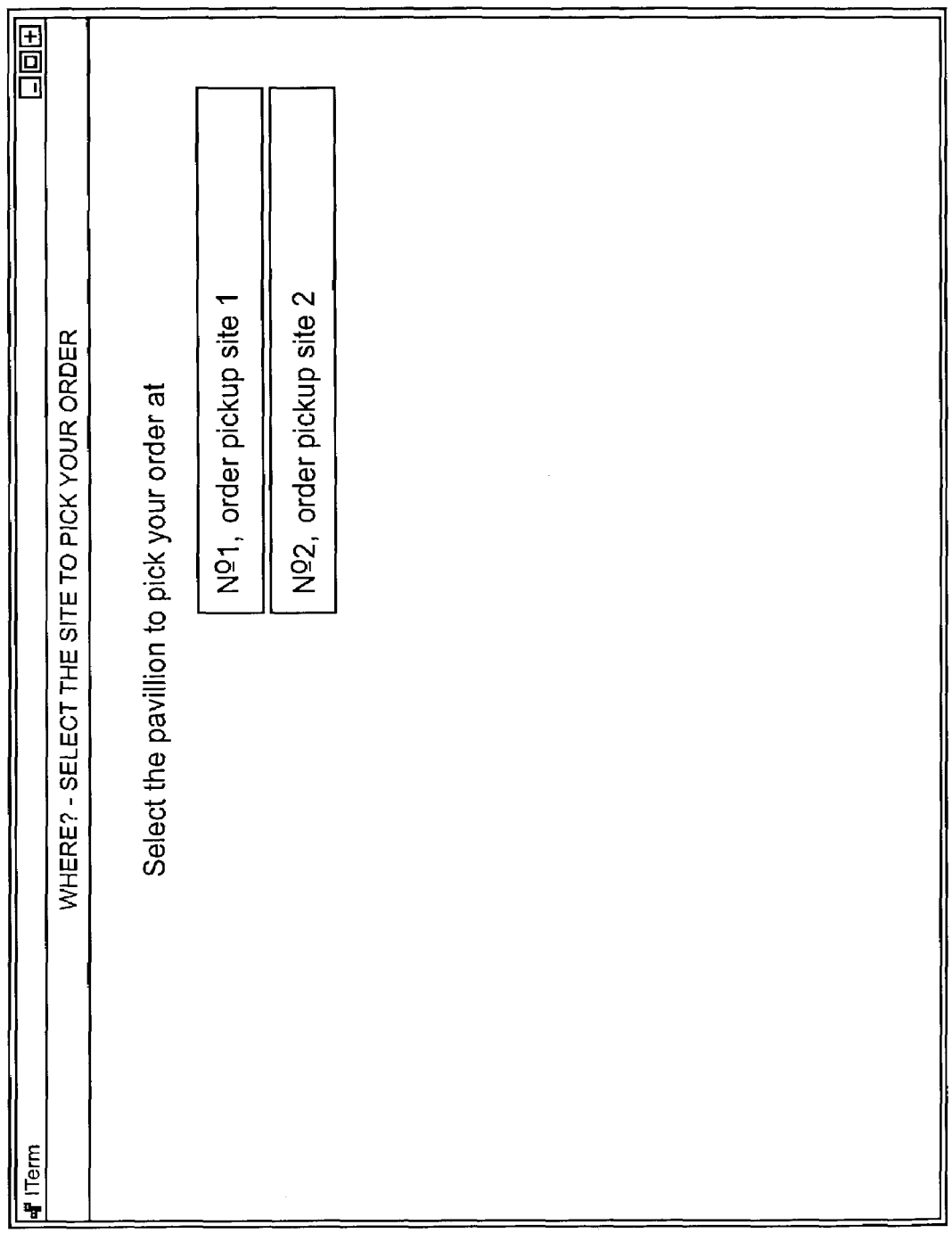

If the customer wants to change the default time, she may activate button "CHANGE PICKUP TIME" displayed on the welcome screen. In response, the GUI 36 displays a pickup time selection screen (FIG. 4) to enable the customer to select the time for delivering the ordered purchase from the storage facility 14 to a selected location (step 104). Then, a pickup place selection screen (FIG. 5) is displayed to enable the customer to select a location for the ordered purchase delivery (step 106). For example, an appropriate purchase obtaining location may be selected from a list of available purchase obtaining locations displayed on the pickup place selection screen. Alternatively, the GUI 36 may switch to the pickup place selection screen from the welcome screen, when the customer activates button "CHANGE PICKUP SITE".

At step 108, when the customer is identified, and the time and location for delivery of the ordered purchase are selected, the GUI 36 may display promotional information relevant to that customer. The promotional information may be displayed taking into account preferences of a particular customer determined based on a history of her previous purchase orders.

Figure 6:
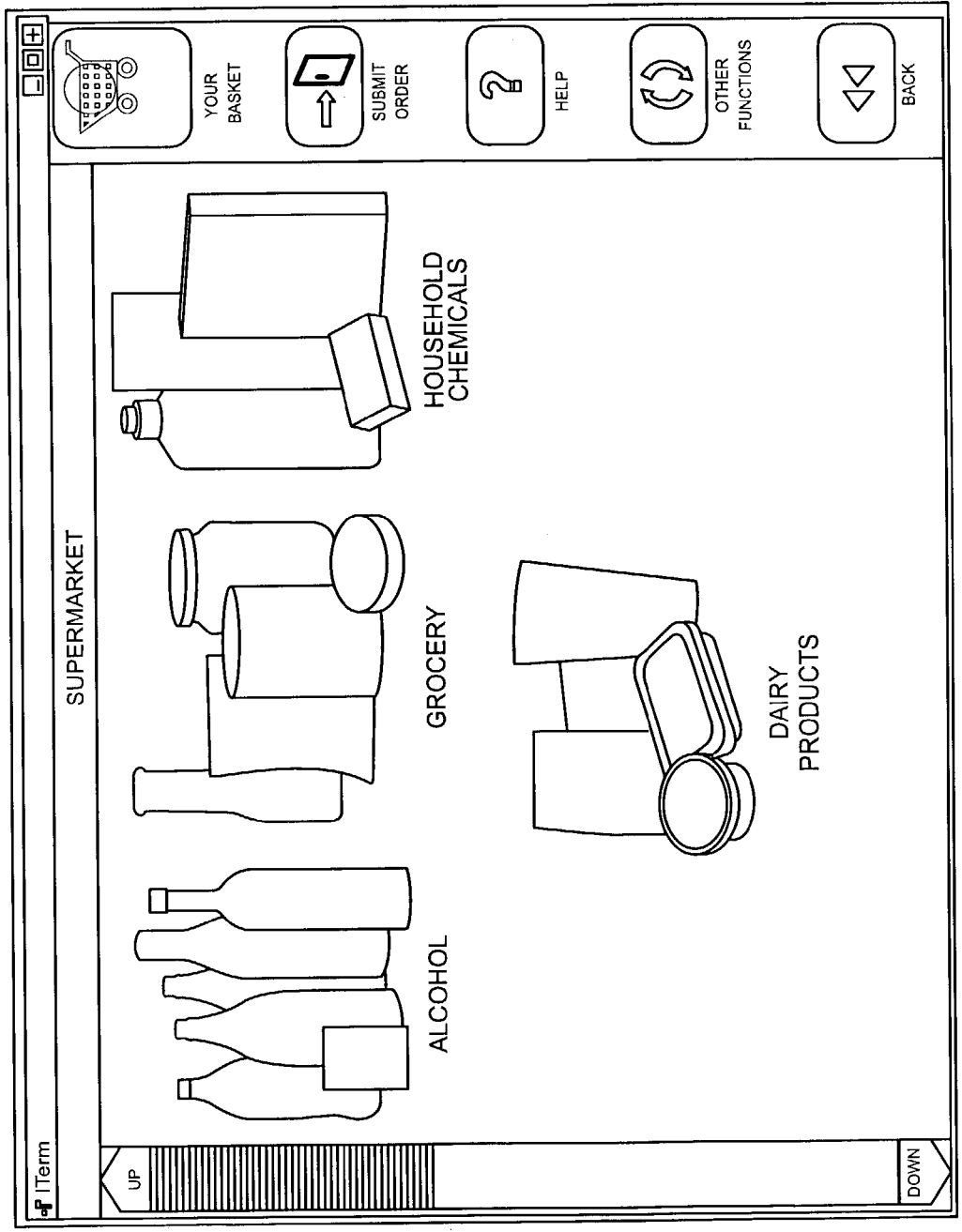
FIG. 6 shows a supermarket screen displayed by the GUI to present various categories of available products.

At step 110, the GUI 36 displays a supermarket screen (FIG. 6) that shows various categories of available products. Although the specification and drawings illustrate an example of food product ordering in the retail system 10, the present invention is applicable to ordering any products or services required by customers. In addition to information on product categories, the supermarket screen in FIG. 6 contains various operational buttons that facilitate the product ordering process. As discussed below, other screens displayed by the GUI 36 also contain the operational buttons.

Figure 10:
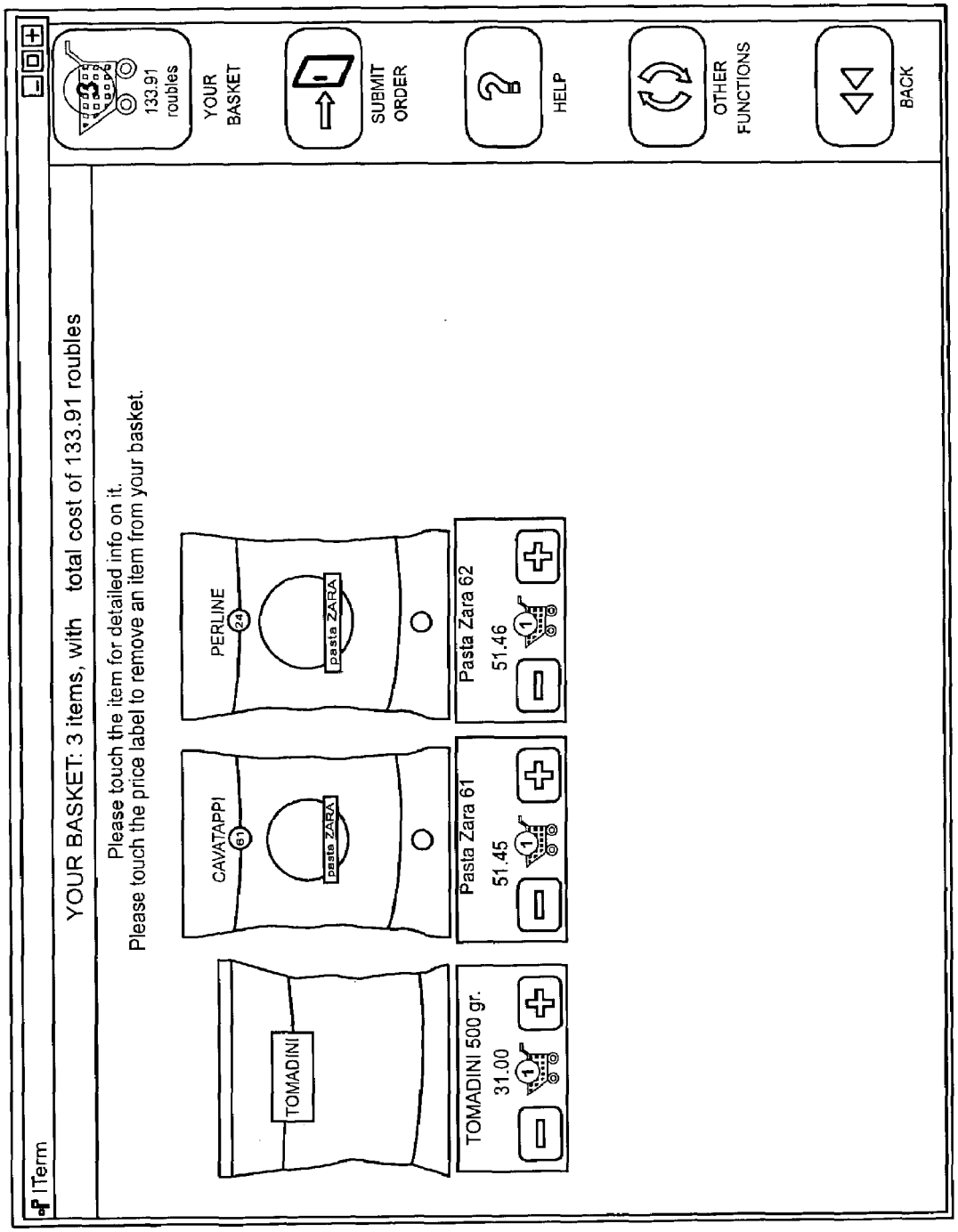
FIG. 10 shows a basket content screen enabling a customer to review the content of her basket or shopping card.

For example, the operational buttons include a purchase icon, such as a button "YOUR BASKET" that may show a number of items currently selected for ordering and the total price of the selected items. As discussed below, when the customer activates this button, the GUI 36 displays a basket content screen (FIG. 10) that shows items currently contained in the customer's basket or shopping card.

Also, the operational buttons may include button "SUBMIT ORDER" for enabling customers to place an order based on items contained in the basket. As discussed below, when the customer activates this button, the GUI 36 may display an order review screen (FIG. 11) displaying a list of selected items.

Further, among the operational buttons may be button "HELP" enabling customers to get information on various aspects of the purchase ordering process; button "OTHER FUNCTIONS" enabling customers to perform various operations in connection with the purchase ordering, such as sorting items by price, size, etc., limiting the number of displayed products in accordance with selected criteria, or conducting a search for required products; and button "BACK" enabling customers to return to a previous screen.

Figure 7:
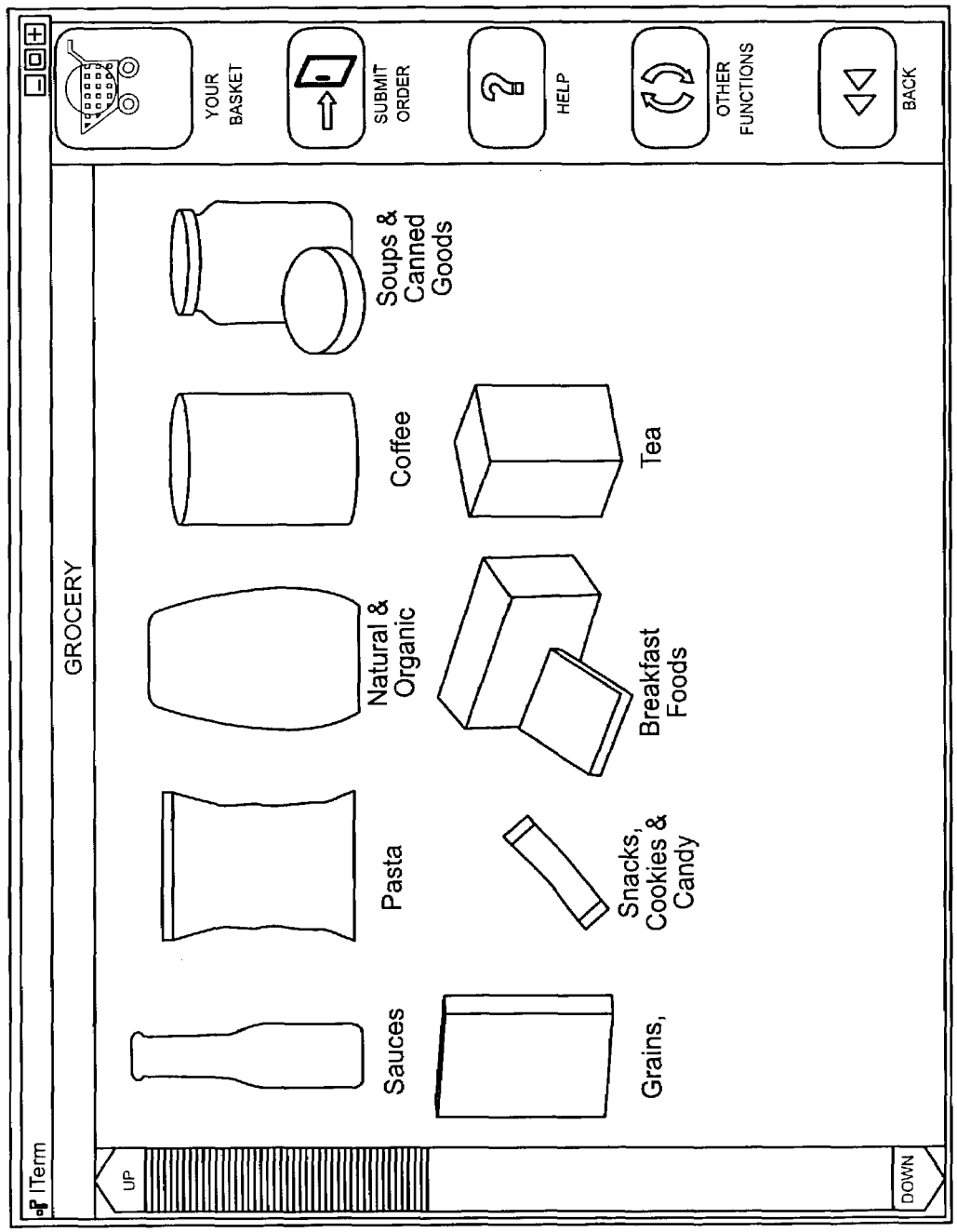
FIG. 7 shows a category screen presenting various sub-categories of a selected category.

At step 112, when the customer selects a required category of products, the GUI 36 displays a category screen (FIG. 7) that shows various sub-categories of the selected category. For example, FIG. 7 illustrates a screen representing grocery.

Figure 8:
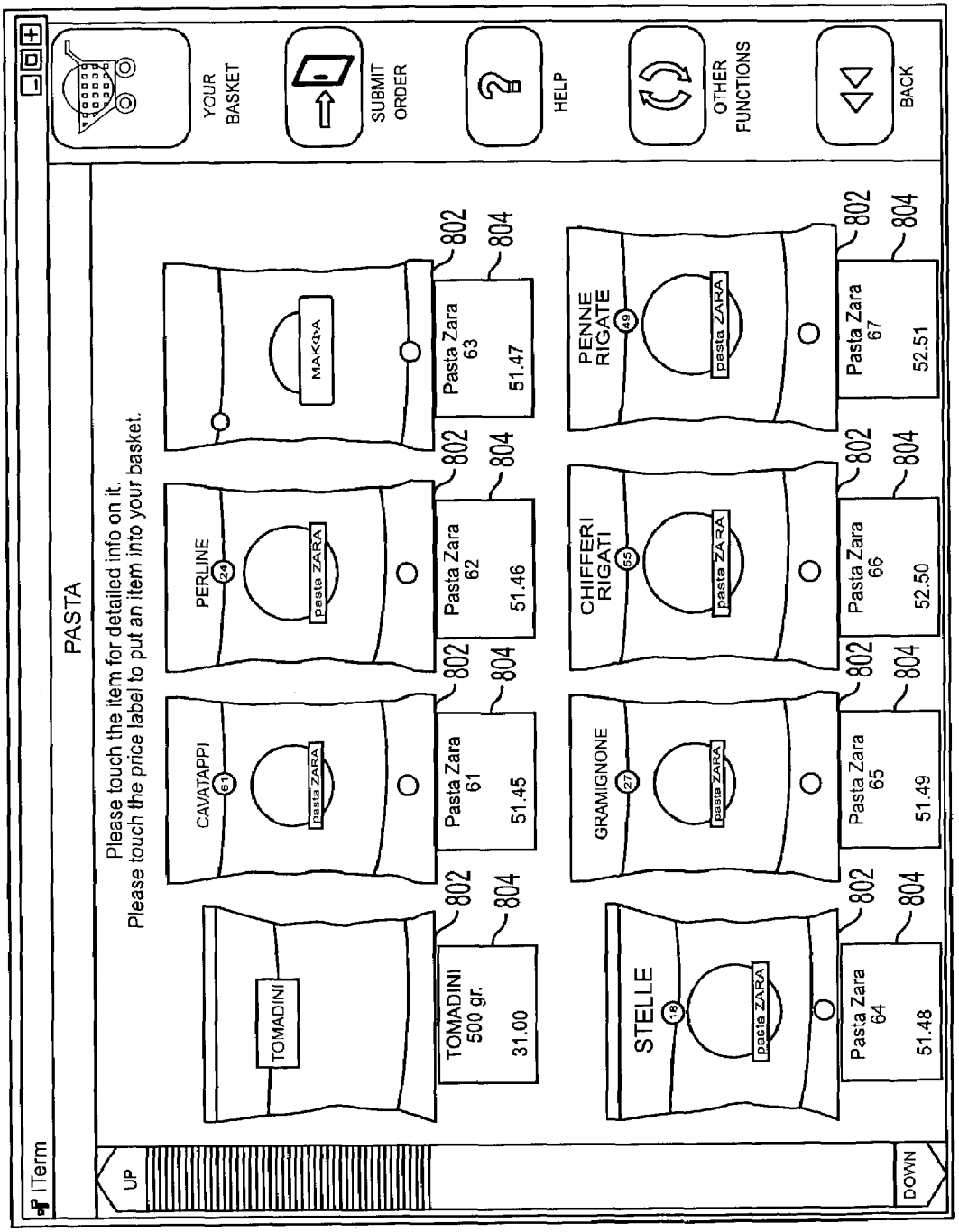
FIG. 8 shows a supermarket shelves screen presenting a virtual supermarket stand containing multiple horizontal shelves stacked with products of the selected sub-category.

At step 114, in response to customer's selection of a required sub-category or a required group of products, the GUI 36 displays a supermarket shelves screen (FIG. 8) showing a virtual supermarket stand containing multiple horizontal shelves stacked with products of the selected sub-category or group. Each of the displayed shelves contains selectable elements 802 of a first type in a form of product images that represent multiple products in the selected sub-category or group, and selectable elements 804 of a second type in a form of price tags or price labels adjacent respective product's images. Each displayed price tag or price label attached to a displayed product identifies the respective product and shows its price. For example, FIG. 8 illustrates multiple virtual shelves filled with various types of pasta.

It was experimentally determined that the GUI 36 that presents available products in the two-dimensional arrangement offered by the present invention creates customer's perception of virtual products as being a physical reality, expedites customer's assessment of presented information and allows a larger number of products to be displayed on a single screen. As a result, the customer is enabled to easier and quicker find and order required products.

Moreover, in accordance with another aspect of the present invention, when a customer touches or selects the price tag attached to a product on the virtual shelf, the GUI 36 immediately places that product into the customer's basket or shopping card, and increments by one the number of items shown on button "YOUR BASKET." If the customer touches or selects the image of the product, the GUI 36 displays a product information screen (FIG. 9) showing an enlarged image of the product and information relevant to that product. These features further increase efficiency of the product ordering in accordance with the present invention.

For example, at step 116, the GUI 36 may determine whether a price tag attached to a product is selected. If so, the respective product is placed into the basket (step 118).

If no, the GUI 36 performs step 120 to determine whether the image of a product is selected. If so, the GUI 36 displays the product information screen corresponding to the selected product (step 122).

Figure 9:
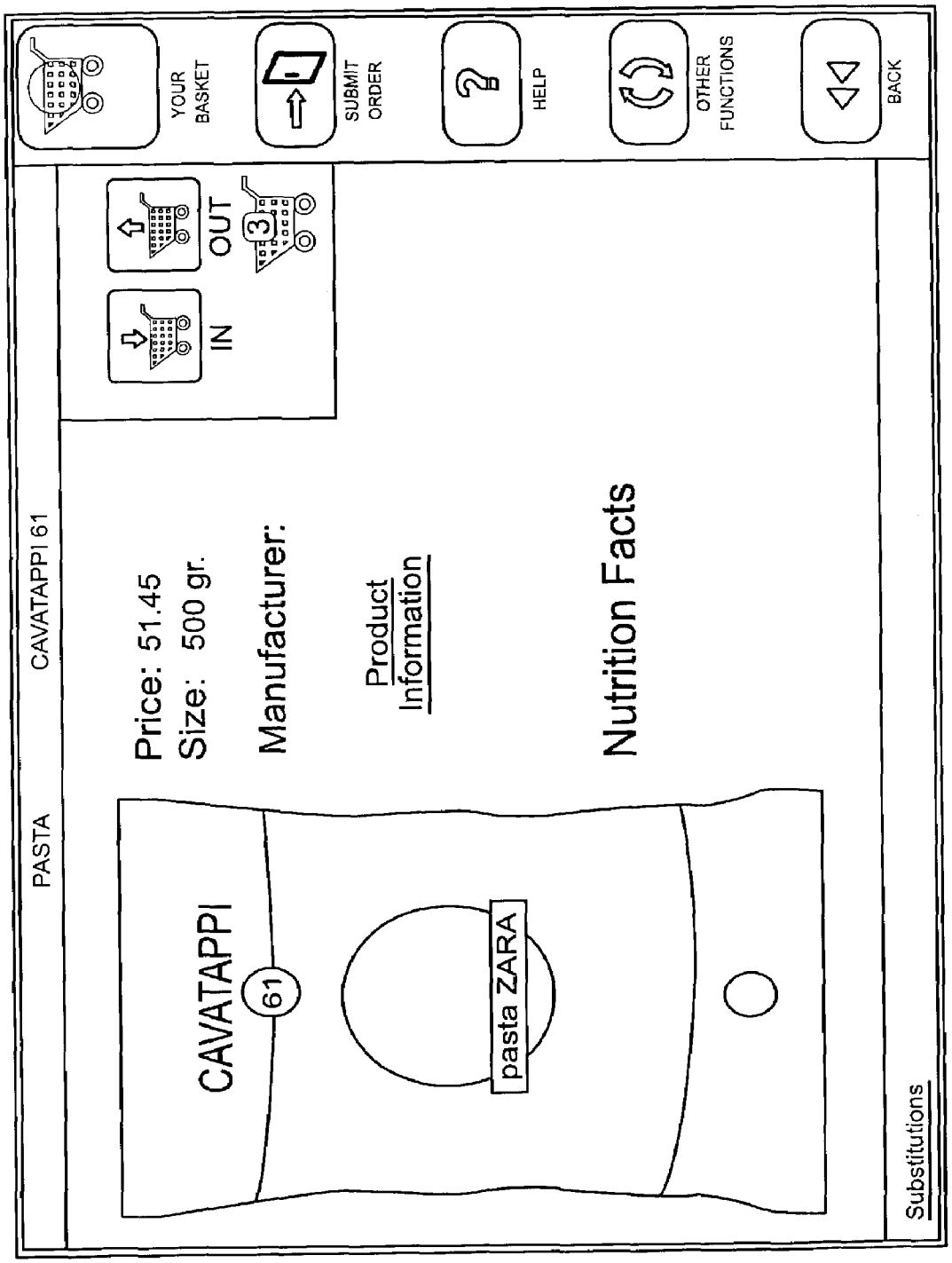
FIG. 9 shows a product information screen presenting information on products.

As illustrated in FIG. 9, the product information screen may show an enlarged image of the product, and provide information relevant to that product such as product identification information, product manufacturer information, ingredient information, nutrition information, information on substitutions for the product, etc. Also, the product information screen may contain buttons "IN" and "OUT" that enable customers to place the respective product into the basket or to remove that product from the basket. After reviewing the product information on the product information screen, the customer may return to the supermarket shelves screen shown in FIG. 8.

In accordance with a further aspect of the present invention, the GUI 36 enables customers to limit the number of products displayed on the supermarket's shelves screen in accordance with selected criteria. For example, the customer may request that only products of a selected price range or size range be displayed. Also, customers may limit the displayed products to goods of certain quality. For example, customers may request displaying only low-fat or no-fat products.

In addition, the GUI 36 enables customers to select the order in which products are displayed on the supermarket shelves screen. For example, products may be displayed in order of their price, size or nutritional values, such as calorific values and cholesterol content.

As discussed above, during the product ordering process, the GUI 36 enables customers to view the content of their basket or shopping card. For example, when the customer activates button "YOUR BASKET," the GUI 36 displays a basket content screen (FIG. 10) that shows items contained in the customer's basket or shopping card (step 124). On the basket content screen, the GUI 36 displays product images arranged in vertical rows simulating products on supermarket's shelves. Each displayed product has a price tag attached to it. The price tag identifies the respective product and shows its price. Also, the price tag on the basket content screen may contains buttons "+" for placing additional quantities of the respective product into the basket and "−" for removing the respective product from the basket.

When a customer touches or selects the product image, the GUI 36 displays the product information screen similar to the screen in FIG. 9 containing an enlarged image of the respective product and information on that product. When the customer touches or selects button "+" on the price tag, the GUI 36 places a unit of the respective product into the basket. When the customer touches or select button "−" on the price tag, a unit of the respective product is removed from the basket.

When all products required by the customer are in the basket, the customer may activate button "SUBMIT ORDER" to complete ordering. In response to activation of this button, the GUI 36 displays an order review screen (FIG. 11) to enable the customer to review the order (step 126). The order review screen shows a list of products selected by the customers. If the customer satisfies with this list, she may activate button "PLACE ORDER" on the order review screen to place an order for the selected products (step 128).

As discussed above, the customer's order is transferred to the storage facility 14 where the purchase composed of the ordered products is assembled for delivery to a purchase obtaining point selected by the customer.

Hence, the GUI of the present invention presents a group of products relating to a category or a sub-category selected by a customer, in a two-dimensional arrangement as multiple virtual supermarket shelves filled with products of that group. The virtual shelves also contain price tags or price labels attached to each product. When a customer touches or selects the price tag, the GUI places the respective product into the customer's basket. When the customer touches or select the product on the virtual shelf, the GUI displays a product information screen containing an enlarged image of that product and information on the product.

It was experimentally determined that a GUI that presents available products in the two-dimensional arrangement offered by the present invention creates customer's perception of virtual products as being a physical reality, expedites customer's assessment of presented information and allows a larger number of products to be displayed on a single screen. As a result, the customer is able to easier and quicker find and order required products. Moreover, virtual shopping using the GUI of the present invention becomes enjoyable experience.

Furthermore, the ability to place a product into the basket by touching or selecting the price tag attached to that product, combined with the ability to view a larger image of the product and information relevant to that product by touching or selecting the displayed image of the product, reinforces the customer's perception of virtual shopping as being real and further expedites product ordering process.

Accordingly, the present invention provides a user-friendly GUI that substantially facilitates product ordering process.

Those skilled in the art will recognize that the present invention admits of a number of modifications, within the spirit and scope of the inventive concepts, and that it may be applied in numerous applications, only some of which have been described herein. It is intended by the following claims to claim all such modifications and variations which fall within the true scope of the invention.

What is claimed is:

1. A computing apparatus configured for operating a graphical user interface (GUI) for enabling a customer to select products, comprising:
   a displaying mechanism configured to display at least one virtual shelf and a purchase icon representing a purchase composed of items selectable by the customer, the virtual shelf containing a plurality of virtual products, each virtual product representing an available product and including a selectable product element and a selectable price tag element attached the product element, the product element providing a graphical representation of the available product and the price tag element indicating a price of the product; and
   a selection mechanism responsive to customer's selection of the product element for controlling the displaying mechanism to display information on the product represented by the product element, and responsive to customer's selection of the price tag for controlling the displaying mechanism to modify the purchase icon so as to reflect addition of the product represented by the product element to the purchase.

2. The apparatus of claim 1, wherein said displaying mechanism is configured to display multiple horizontal virtual shelves containing selectable product elements and selectable price tag elements.

3. The apparatus of claim 1, wherein said selection mechanism is responsive to selection of the purchase icon to display the virtual shelf containing selectable product element and the selectable price tag element attached to said selectable product element.

4. The apparatus of claim 1, further comprising a sorting mechanism responsive to an input from the customer for selecting order in which selectable product elements are arranged on said virtual shelf in accordance with a selected criterion.

5. The apparatus of claim 1, further comprising a limiting mechanism responsive to an input from the customer for limiting number of said selectable product elements on said virtual shelf in accordance with a selected criterion.

6. A system for enabling a customer to select products for a purchase, comprising:

a terminal having a display component with a touch sensitive screen for displaying a purchase area representing the purchase, and a product area comprising a virtual product representing an available product, the virtual product including a product element and a price tag element attached to the product element, the product element providing a graphical representation of the product, and the price tag element representing a price of the product, and a selection mechanism responsive to customer's selection of the product element for causing the terminal to display information on the product, and responsive to customer's selection of the price tag element for causing the terminal to modify the purchase area so as to reflect addition of the product to the purchase.

7. The system of claim 6, wherein the terminal is provided at a retail facility.

8. A computer system for enabling a customer to select products for a purchase, comprising:

a processor, and a memory coupled to the processor, the memory having stored therein at least one sequence of instructions, which when executed by the processor, causes the computer system to perform the steps of:

displaying a screen having a purchase area representing the purchase, and a product area comprising a virtual product representing an available product, the virtual product including a product element and a price tag element attached to the product element, the product element providing a graphical representation of the product, and the price tag element representing a price of the product;

displaying information on the product, when the customer selects the product element, and modifying the purchase area to include information indicating that the product is added to the purchase, when the customer selects the price tag element.

* * * * *